United States Patent Office 3,189,641
Patented June 15, 1965

3,189,641
STYRYL DYESTUFFS
Alfred Brack, Leverkusen, and Werner Müller, Cologne, Germany, assignors to Farbenfabriken Bayer Aktiengesellschaft, Leverkusen, Germany, a German corporation
No Drawing. Filed Nov. 4, 1960, Ser. No. 67,168
Claims priority, application Germany, Nov. 21, 1959,
F 29,899
3 Claims. (Cl. 260—465)

The invention relates to new styryl dyestuffs and to a process for their production; more particularly it concerns styryl dyestuffs of the formula

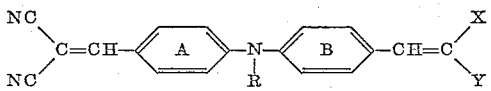

In this formula R stands for lower alkyl, such as methyl, ethyl, propyl, butyl, which shall comprise lower isoalkyl, such as isopropyl and isobutyl, cycloalkyl, such as cyclopentyl and cyclohexyl, aralkyl, such as benzl, and aryl, such as phenyl. The alkyl, including isoalkyl, aralkyl and aryl radicals may be further substituted by non-ionic substituents. Preferred substituents are halogen such as chlorine, bromine and fluorine, hydroxyl, nitro, methoxy, ethoxy, lower alkyl, such as methyl, ethyl, propyl, butyl, and cyano substituents. X and Y denote CN, an acyl group, such as radicals of possibly substituted aliphatic, aromatically carbocyclic or heterocyclic carboxylic acids and aliphatic and aromatically carbocyclic sulfonic acids, e.g. phenyl- or methyl-sulfonyl radicals which may also carry further non-ionic substituents. X and Y may further mean carboxylic acid amide groups or carboxylic acid ester groups; X and Y may be identical or different; X or Y may further stand for aryl radicals. The aromatic nuclei A and B of the diphenylamine may also carry non-ionic substituents.

The new dyestuffs are obtainable by reacting 1 mol of a diphenylamine-4,4'-dialdehyde which is further substituted at the diphenyl-nitrogen atom by a lower alkyl, cycloalkyl, aralkyl or aryl radical, with 1 mol of malonodinitrile and, subsequently, with at least 1 mol of a compound having the general formula

wherein X and Y have the above significance.

A modification of this process consists in reacting 1 mol of the dialdehyde first with about 1 mol of a compound of the formula

and, subsequently, with at least 1 mol of malonodinitrile. If only malonodinitrile is used, the reaction can be carried out by the simultaneous action of at least 2 mols of malonodinitrile.

The symmetrical dyestuffs may be produced by dissolving or suspending 1 mol of the dialdehyde in a suitable solvent or diluent which is inert to the reaction partners, for example an alcohol, ester, nitrile, cyclic ether, aromatic or aliphatic hydrocarbon, halogenated hydrocarbon or dimethyl formamide, adding at least 2 mols of malonodinitrile and heating the mixture. The reaction can be strongly accelerated by adding small amounts of a basic catalyst such as piperidine, diethyl amine or alkali metal hydroxide. In general, heating to temperatures of 70–100° C. for 1–2 hours will suffice to complete the reaction, but heating may also be effected to much higher temperatures for substantially longer periods, since the new dyestuffs are thermally very stable. By using a suitable solvent an almost complete precipitation of the dyestuffs can be achieved which crystallise readily in most cases and can then be isolated by simple suction-filtering.

It is also possible to distil off the solvent or to precipitate the dissolved dyestuff by the addition of a slightly solubilizing or non-solubilizing liquor which is miscible with the solvent, for example water or benzine.

In order to produce asymmetrical dyestuffs, one mol of dialdehyde is first reacted with about one mol of a compound of the general formula

in the manner described above, at least one mol of malonodinitrile is then added and the condensation completed by further heating.

It is possible though not necessary to isolate the intermediate product which has been reacted on the one side of the diphenylamine-4,4'-dialdehyde. The order of reactions may be reversed, i.e. the dialdehyde may be reacted first with one mol of malonodinitrile and subsequently with at least one mol of a compound of the general formula

In general, it is expedient to employ the less reactive component first.

The following dialdehydes are for example suitable for the process:

N-methyl-diphenylamine-4,4'-dialdehyde,
N-ethyl-diphenylamine-4,4'-dialdehyde,
N-isopropyl-diphenylamine-4,4'-dialdehyde,
N-cyclopentyl-diphenylamine-4,4'-dialdehyde,
N-β-chlorethyl-diphenylamine-4,4'-dialdehyde,
N-β-cyanoethyl-diphenylamine-4,4'-dialdehyde,
N-methyl-diphenylamine-2,2'-dichloro-4,4'-dialdehyde,
N-phenyl-diphenylamine-4,4'-dialdehyde,
N-4''-methoxyphenyldiphenylamine-4,4'-dialdehyde,
N-benzyl-diphenylamine-4,4'-dialdehyde,
N-4''-nitrobenzyl-diphenylamine-4,4'-dialdehyde.

In addition to malonodinitrile there may be used as methylene component for example cyanacetic acid methyl ester, cyanacetic acid-β-hydroxyethyl ester, cyanacetic acid-β-chlorethyl ester, cyanacetamide, cyanaceto piperidide, cyanacetobenzylamide, cyanaceto-β-hydroxyethylamide, cyanomethylphenylsulphone, cyanomethylmethylsulphone, ω-cyanacetonephenone, benzylcyanide, 4-nitrobenzylcyanide, acetyl-acetone, dibenzoylmethane, phenylacetic acid ethyl ester, cyanomethyl-4-chlorophenylsulphone, 4-nitrophenylacetic acid ethyl ester.

The majority of the new dyestuffs are yellow to orange-red crystal powders which are soluble in suitable organic solvents.

The dyestuffs are suitable for the dyeing and printing of articles such as fabrics, filaments and the like, from synthetic materials such as aromatic or aliphatic polyesters, polyamides, polystyrene, polyacrylonitrile, polyvinyl chloride, polycarbonates, etc. The dyeings on these materials are carried out by methods known as such, the method of dyeing during the spinning process being also applicable. The dyeing of polyester fibres, for example, is carried out by applying the finely dispersed dyestuffs from an aqueous weakly acid dyebath to the fibre material without the addition of dyeing accelerators (carriers) at temperatures above 100° C., or by dyeing at boiling temperature, preferably in the presence of a dyeing accelerator such as benzoic acid, salicylic acid ester or cresotinic acid ester or chlorinated hydrocarbons or aryl-phenols.

For printing this type of fibre, the dyestuffs are worked into printing pastes of conventional composition together with carriers, if so desired, applied to the fibre and fixed by steaming or brief dry heating to elevated temperatures.

The application of the dyestuffs to other synthetic materials including the dyeing of spinning or pressing masses, is likewise carried out according to conventional processes.

The new dyestuffs are distinguished by excellent drawing power and a very high yield on polyester materials such as polyethylene terephthalate fabrics: the resulting dyeings and prints show a high brilliancy and very good fastness to light, washing and sublimation.

When dyeing mixed fabrics from polyester materials and wool, the wool portion is not dyed. It is moreover surprising, that during the dyeing of plastics such as polycarbonate masses, the new dyestuffs resist temperatures of about 300° C. without any decomposition.

Dyestuffs of similar structure are already known from U.S. patent specification No. 2,766,233; however, they are produced without using malonodinitrile as at least one of the two active methylene compounds. Compared with the products described in said patent specification, the styryl dyestuffs obtained according to the present invention show an improved fastness to light in dyeings on fabrics of polyethylene terephthalate.

The following examples are given for the purpose of illustrating the invention without, however, limiting it thereto.

*Example 1*

100 parts by weight of alcohol are poured over 12.6 parts by weight of N-ethyl-diphenylamine-4,4'-dialdehyde and 7.5 parts by weight of malonodinitrile. After the addition of 0.01–0.1 part by weight of piperidine the mixture is heated to the boil and stirred at boiling temperature for 1½ hours. The mixture is allowed to cool, filtered off with suction, washed with alcohol, dried in usual manner, and the dyestuff of the formula

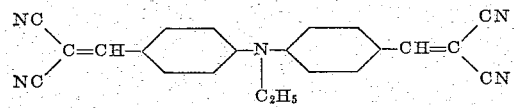

with melting point 177–179° C. is thus obtained in an almost quantitative yield. After re-crystallisation from acetonitrile or dioxane, the melting point lies at 180° C.

*Example 2*

Into a dyebath consisting of 0.02 part by weight of the thoroughly dispersed dyestuff of the formula

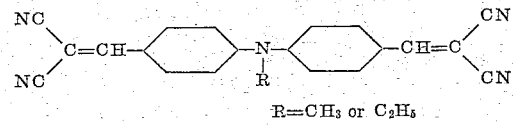

R=CH$_3$ or C$_2$H$_5$ 4.0 parts by weight of benzoic acid and 400 parts by weight of water there are introduced at about 40° C. 10.0 parts by weight of polyethylene glycol terephthalate, the bath is heated to the boil within about 30 minutes, while agitating the fibre, and kept at boiling temperature for an hour. After rinsing and drying, an extraordinarily clear yellow dyeing is obtained which is very fast to light, washing and sublimation.

*Example 3*

12.0 parts by weight of N-methyl-diphenylamine-4,4'-dialdehyde are dissolved in 100 parts by weight of boiling methanol and 0.01–0.1 part by weight of piperidine are added. To the boiling solution, a mixture of 4.9 parts by weight of cyanacetic acid methyl ester and 25.0 parts by weight of methanol are added dropwise and the mixture is kept boiling for another 30 minutes.

Upon cooling, the reaction product crystallises out and is isolated by filtering off with suction at 0° C. in an excellent yield and sufficient purity for further processing. The melting point is 160° C.

25.0 parts by weight of the dyestuff thus obtained are heated to the boil with 5.2 parts by weight of malonodinitrile, 200.0 parts by weight of acetonitrile and 0.1 part by weight of piperidine for 2 hours while stirring. After cooling, the product is filtered off with suction. The dyestuff of the formula

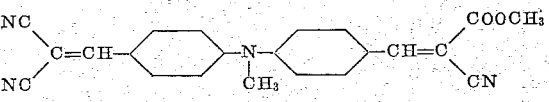

is thus obtained in almost quantitative yield. The product melts at 170° C.

*Example 4*

A dyebath containing 0.1 part by weight of the dyestuff described in Example 3,
2.0 parts by weight of o-phenylphenol or an equivalent amount of another dyeing accelerator, for example a chlorinated benzene-hydrocarbon, salicylic acid or cresotinic acid ester, and
400 parts by weight of water is adjusted with sulphuric acid to a pH value of about 4–5. Into this bath
10.0 parts by weight of polyester fibres are introduced and dyed in the manner described in Example 2. After rinsing and drying, a very deep yellow dyeing of excellent fastness to light, washing and sublimation is obtained.

*Example 5*

A dyebath consisting of 0.05 part by weight of the dyestuff indicated in Example 2 and
400 parts of water is brought to a pH value of about 4–5 by means of sulphuric acid and
10.0 parts by weight of polyester fibres are placed into it. The bath is heated in a closed dyeing apparatus to 120–125° C. within 20–30 minutes and dyeing is carried out at this temperature for an hour. After rinsing and drying, a full yellow dyeing is obtained having the above mentioned properties.

*Example 6*

A polyester fabric, ready for printing, is printed with a dyeing paste of the following composition:

| | |
|---|---|
| 5–6 | parts by weight of the dyestuff indicated in Example 1 |
| 50 | parts by weight of thiodiethylene glycol |
| 500 | parts by weight of alginate thickening |
| 15 | parts by weight of cresotinic acid methyl or ethyl ester |
| 20 | parts by weight of Monopole Brilliant Oil |
| 409–410 | parts by weight of water |
| 1000 | parts by weight |

The composition of the printing paste may be varied in a suitable manner without impairing the quality of the prints. Thus, it is possible, for example, to use crystalline gum instead of alginate thickening or to replace the cresotinic acid ester by another dyeing accelerator.

The dyestuff is fixed on the fibre by steaming at about 100° C. or under a pressure of about 1.5 atm. It is also possible to fix the dyestuff by a short dry heating to about 200° C. The material is then rinsed cold, soaped at 70–80° C. for about 10 minutes, rinsed again first hot, then cold, and dried. Deep extremely brilliant greenish-yellow prints of very good properties are thus obtained.

*Example 7*

100 parts by weight of a co-polymerisate from 75 parts by weight of an unsaturated polyester built up from phthalic acid, maleic acid and butylene glycol, and 25 parts by weight of styrene are rubbed on a roller mill at room temperature with 0.05 part by weight of the dyestuff indicated in Example 2. The resulting product is melted, poured into a mould and hardened at about 110° C. A clear deep yellow dyed piece is thus obtained which is fluorescent in daylight and has excellent fastness to light.

*Example 8*

100 parts by weight of granulated polystyrene are intimately mixed on a roller mill with 0.1 part by weight of the dyestuff indicated in Example 1. The resulting product is sprayed at 220–260° C. in a spray moulding apparatus. Yellow shaped pieces are thus obtained which are fluorescent in daylight and have excellent fastness to light. By admixing 0.5 part by weight of titanium dioxide covering dyeings may be produced.

*Example 9*

When using for the production of the new dyestuffs according to one of the processes described in the preceding examples or modifications thereof the starting components indicated in the following table, valuable styryl dyestuffs are likewise obtained which upon dyeing, printing or dyeing during the spinning process yield on various synthetic materials fast dyeings in the shades listed below. For the sake of simplicity only the shades obtained on polyester materials are given. On other materials such as polyamides, polystyrene, polycarbonate etc. the same or similar shades are obtained.

We claim:
1. A styryl dyestuff of the formula

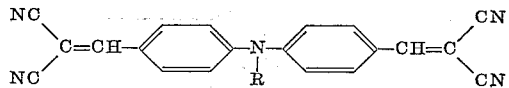

wherein R stands for lower alkyl.

2. The styryl dyestuff of the formula

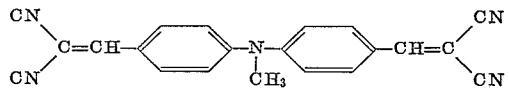

3. The styryl dyestuff of the formula

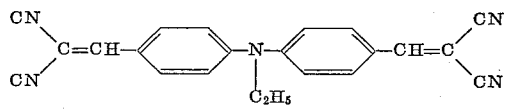

(References on following page)

| Dialdehyde component OHC–⟨⟩–N(R)–⟨⟩–CHO | Methylene-compound I | Methylene-compound II | Colour of crystals | Shade of dyeing on polyethylene terephthalate |
|---|---|---|---|---|
| R=Methyl | Malonodinitrile | Malonodinitrile | Yellow | Greenish yellow. |
| Ethyl | do | do | do | Do. |
| Benzyl | do | do | do | Do. |
| Phenyl | do | do | do | Do. |
| Methyl | do | Cyanacetic acid methyl ester | do | Do. |
| Do | do | Cyanacetamide | do | Strongly greenish yellow. |
| Ethyl | do | Cyanacetic acid methyl ester | do | Greenish yellow. |
| Do | do | Cyanacetamide | do | Strongly greenish yellow. |
| Isopropyl | do | Malonodinitrile | Yellow | Greenish yellow. |
| Do | do | Cyanacetic acid ethyl ester | do | Do. |
| Cyclopentyl | do | Malonodinitrile | do | Do. |
| β-chlorethyl | do | do | do | Do. |
| Do | do | Cyanaceto piperidide | Greenish yellow | Strongly greenish yellow. |
| β-cyanethyl | do | Malonodinitrile | Yellow | Greenish yellow. |
| Do | do | Cyanacetobenzylamide | Greenish yellow | Strongly greenish yellow. |
| 4-nitrobenzyl | do | Malonodinitrile | Yellow | Yellow. |

| OHC–⟨R'⟩–N(R)–⟨R''⟩–CHO | | | | | | |
|---|---|---|---|---|---|---|
| R | R' | R'' | | | | |
| CH₃ | Cl | H | Malonodinitrile | Malonodinitrile | yellow | Greenish yellow. |
| CH₃ | Cl | H | do | Cyanacetamide | do | Do. |
| CH₃ | Cl | H | do | Cyanacetic acid methyl ester | do | Do. |
| C₂H₅ | Cl | H | do | Malonodinitrile | do | Do. |
| CH₃ | Cl | Cl | do | do | do | Do. |
| CH₃ | Cl | Cl | do | Cyanacetamide | Greenish yellow | Do. |
| CH₃ | Cl | Cl | do | Cyanacetic acid methyl ester | Yellow | Do. |
| CH₃ | NO₂ | H | do | Malonodinitrile | do | Yellow. |
| CH₃ | NO₂ | H | do | Cyanacetamide | do | Do. |
| CH₃ | NO₂ | H | do | Cyanacetic acid ethyl ester | do | Do. |
| CH₃ | NO₂ | Cl | do | Malonodinitrile | do | Do. |
| CH₃ | NO₂ | Cl | do | Cyanacetamide | do | Do. |
| CH₃ | NO₂ | Cl | do | Cyanacetic acid methyl ester | do | Do. |
| CH₃ | Br | Cl | do | Malonodinitrile | do | Do. |

References Cited by the Examiner

UNITED STATES PATENTS

| | | | |
|---|---|---|---|
| 2,043,081 | 6/36 | Wahl | 260—465 |
| 2,179,895 | 11/39 | Muller et al. | 260—465 X |
| 2,398,321 | 4/46 | Mowry. | |
| 2,465,318 | 3/49 | Seymour. | |
| 2,583,551 | 1/52 | Dickety et al. | 260—465 |
| 2,583,614 | 1/52 | Taylor et al. | 260—465 |
| 2,667,411 | 1/54 | Mowry et al. | 260—465 X |
| 2,741,631 | 4/56 | Sauer | 260—465 X |
| 2,766,233 | 10/56 | Kartinos et al. | 260—471 X |
| 2,850,520 | 9/58 | Merian et al. | 260—465 |
| 2,881,045 | 4/59 | Mecco et al. | 8—55 |
| 2,934,397 | 4/60 | Landerl | 8—55 |
| 3,027,220 | 3/62 | Merian et al. | 260—465 X |

OTHER REFERENCES

Coenen et al.: Zeitschrift für Elektrochemie, vol. 57, 1953, pp. 785–787.

CHARLES B. PARKER, *Primary Examiner*.